(12) United States Patent
Strasser et al.

(10) Patent No.: US 9,762,419 B2
(45) Date of Patent: Sep. 12, 2017

(54) EDGE-BASED COMMUNICATION WITH A PLURALITY OF SLAVE DEVICES

(71) Applicant: Infineon Technologies AG, Neubiberg (DE)

(72) Inventors: Michael Strasser, Villach (AT); Christian Reidl, Villach (AT); Gerhard Pircher, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/458,745

(22) Filed: Aug. 13, 2014

(65) Prior Publication Data

US 2016/0050089 A1 Feb. 18, 2016

(51) Int. Cl.
*H04L 25/49* (2006.01)
*H04L 29/08* (2006.01)

(52) U.S. Cl.
CPC .......... *H04L 25/4902* (2013.01); *H04L 67/10* (2013.01)

(58) Field of Classification Search
USPC ........................................ 375/238, 220, 222
See application file for complete search history.

(56) References Cited

U.S. PATENT DOCUMENTS

| | | | |
|---|---|---|---|
| 4,388,725 A | 6/1983 | Saito et al. | |
| 4,531,068 A | 7/1985 | Kraft et al. | |
| 5,646,996 A | 7/1997 | Latka | |
| 5,787,132 A * | 7/1998 | Kishigami | H04L 7/042 370/304 |
| 6,060,906 A | 5/2000 | Chow et al. | |
| 6,201,811 B1 | 3/2001 | Larsson et al. | |
| 6,275,550 B1 | 8/2001 | Fukuda | |
| 6,405,337 B1 | 6/2002 | Grohn et al. | |
| 6,496,889 B1 | 12/2002 | Perino et al. | |
| 6,609,224 B1 | 8/2003 | Jonsson | |
| 6,977,930 B1 | 12/2005 | Epps et al. | |
| 7,027,773 B1 | 4/2006 | McMillin | |
| 7,269,774 B2 | 9/2007 | Sudo | |
| 7,627,121 B1 | 12/2009 | Reeds, III et al. | |
| 7,627,804 B2 | 12/2009 | Bains | |
| 7,653,757 B1 | 1/2010 | Fernald et al. | |
| 7,809,870 B2 | 10/2010 | McDaniel | |
| 7,982,512 B2 | 7/2011 | Misawa et al. | |
| 8,183,982 B2 | 5/2012 | Scherr | |

(Continued)

FOREIGN PATENT DOCUMENTS

| | | |
|---|---|---|
| DE | 102008031498 A1 | 1/2010 |
| JP | S56153866 A | 11/1981 |

(Continued)

OTHER PUBLICATIONS

TLE4998C3 TLE4998C4 "Programmable Linear Hall Sensor"; Data Sheet—Infineon; Rev 1.0, Dec. 2008, p. 1-44.

(Continued)

*Primary Examiner* — Kabir A Timory
(74) *Attorney, Agent, or Firm* — Eschweiler & Associates, LLC (57) ABSTRACT

Methods, systems and devices related to bidirectional edge-based pulse width modulation communication systems are disclosed. In some implementations, upon receipt of a predetermined trigger pulse at least two slave devices perform an action.

15 Claims, 5 Drawing Sheets

(56) References Cited

U.S. PATENT DOCUMENTS

| | | |
|---|---|---|
| 8,301,972 B2 | 10/2012 | Tang |
| 8,519,819 B2 | 8/2013 | Scherr |
| 8,948,280 B2 | 2/2015 | Hammerschmidt et al. |
| 9,469,306 B2 | 10/2016 | Hammerschmidt |
| 2004/0107398 A1 | 6/2004 | Johnson |
| 2004/0208029 A1 | 10/2004 | Caruthers et al. |
| 2005/0127942 A1 | 6/2005 | Smith et al. |
| 2007/0088883 A1 | 4/2007 | Wakabayashi |
| 2008/0198917 A1 | 8/2008 | Mignone |
| 2009/0046773 A1 | 2/2009 | Scherr |
| 2010/0002821 A1 | 1/2010 | Hammerschmidt et al. |
| 2010/0262887 A1 | 10/2010 | Wilson |
| 2011/0280299 A1 | 11/2011 | O'Malley et al. |
| 2012/0158335 A1* | 6/2012 | Donovan ........... G05B 19/0423 702/79 |
| 2012/0195389 A1* | 8/2012 | Scherr ................... H04L 5/1484 375/259 |
| 2014/0101349 A1 | 4/2014 | Engl |
| 2015/0200706 A1 | 7/2015 | Bottazzi et al. |
| 2015/0236876 A1 | 8/2015 | Cadugan et al. |

FOREIGN PATENT DOCUMENTS

| | | |
|---|---|---|
| JP | 58-024925 | 2/1983 |
| JP | 08-023582 | 1/1996 |
| JP | 2003189654 A | 7/2003 |
| JP | 2013017094 A | 1/2013 |

OTHER PUBLICATIONS

U.S. Appl. No. 14/318,741, filed Jun. 30, 2014.
U.S. Appl. No. 14/317,661, filed Jun. 27, 2014.
Notice of Allowance Dated Jul. 31, 2015 U.S. Appl. No. 14/318,741.
Non-Final Office Action dated May 13, 2015 in connection with U.S. Appl. No. 14/318,741.
Non Final Office Action Dated Dec. 18, 2015 U.S. Appl. No. 14/934,729.
Non Final Office Action Dated Mar. 18, 2016 U.S. Appl. No. 14/317,661.
Kramolis, J. "SENT/SPC Driver for the MPC5510 Microcontroller Family." Freescale Semiconductor, Inc. Document No. AN4219, Rev. 0, Oct. 2010. 28 pages.
Notice of Allowance Dated May 31, 2016 U.S. Appl. No. 14/934,729.
Notice of Allowance Dated Jul. 27, 2016 U.S. Appl. No. 14/317,661.

* cited by examiner

# EDGE-BASED COMMUNICATION WITH A PLURALITY OF SLAVE DEVICES

BACKGROUND

The present application relates to devices, systems and methods related to edge-based communication with a plurality of slave devices.

For communication between devices, for example in automotive applications, various protocols are used. One protocol frequently employed is the SENT protocol (single edge nibble transmission). This protocol may for example be used in applications where high resolution data is transmitted for example from a sensor device to an electronic control unit (ECU).

The SPC protocol (short PWM code; PWM meaning pulse width modulation) is an extension of the SENT protocol and aims at increasing performance of a communication link and reducing system costs at the same time. To some extent, SPC allows bidirectional communication and is an example of an edge based PWM protocol. For example, SPC may introduce a half-duplex synchronous communication. A receiver (e.g. master) generates for example a master trigger pulse on a communication line by pulling it low for a defined amount of time. The pulse width (corresponding to the defined amount of time) is measured by a transmitter (e.g. slave), for example a sensor, and a transmission, e.g. a SENT transmission, is initiated only if the pulse width is within a defined limit. The SPC protocol allows choosing between various protocol modes. For example, a synchronous mode, a synchronous mode with range selection or a synchronous transmission with ID selection (also referred to as busmode), where up to four sensors may be connected in parallel to an ECU, may be used. In the latter case, the pulse width of the above-mentioned trigger pulse may define which sensor or other entity will start a transmission. For example, a length of the trigger pulse may indicate an ID of a sensor or other slave device selected for transmission. The sensor or other entity may start the transmission with its own synchronization, which may overlap the trigger pulse.

Conventionally, when using the SPC protocol in the above-mentioned busmode, each sensor may have a different length of the trigger pulse associated therewith. In the conventional SPC protocol, triggering a sensor by a trigger pulse has a comparatively long duration (for example about 90 time units for addressing, e.g. the trigger pulse and at least about 281 time units for responding of the sensor) and therefore takes a comparatively long time. Moreover, between triggering different bus participants like sensors in conventional approaches a pause has been made as the length of transmission from sensor to controller may depend on the data content of the transmission. Therefore, between triggering of different sensors in some conventional approaches at least the longest possible transmission duration plus a safety margin has been kept.

In conventional approaches, when for example a sensor receives a trigger pulse, this triggering causes the sensor to capture or sample sensor data and subsequently send it to a controller or other device. When reading out several sensors, this leads to the data of the different sensors being captured at different points in time, which for some applications may be undesirable.

DETAILED DESCRIPTION

In the following, various embodiments will be described in detail referring to the attached drawings. The embodiments are to be regarded as illustrative examples only and are not to be construed as limiting. For example, while embodiments may be described as comprising a plurality of features or elements, in other embodiments some of these features or elements may be omitted, and/or replaced by alternative features or elements. In yet other embodiments, additional features or elements may be provided.

Any connections or couplings shown in the drawings or described herein may be implemented as direct connections or couplings, i.e. connections or couplings without intervening elements, or indirect connections or couplings, i.e. connections or couplings with one or more intervening elements, as long as the general purpose of the connection or coupling, for example to transmit a certain kind of signal and/or to transmit a certain kind of information, is essentially maintained. Connections or couplings may be wire-based connections or couplings or may also be wireless connections or couplings unless noted otherwise.

Furthermore, features from different embodiments may be combined to form additional embodiments.

In embodiments, an extension to the SPC protocol is proposed. However, these extensions may also be applicable to other communication protocols, for example bidirectional edge-based PWM (pulse width modulation) communication protocols.

In some embodiments, in a bidirectional edge-based PWM communication system comprising a master and a plurality of slaves (i.e., at least two slaves). In some embodiments, a trigger pulse triggers an action in at least a first slave device of the plurality of slave devices and a second slave device of the plurality of slave devices. For example, in some aspects, the first slave device and the second slave device may be sensor devices and sample sensor data at least approximately at the same time in response to the trigger pulse. In other embodiments, the first slave device and the second slave device may transmit data to a controller or other master device, for example consecutively transmit data to the controller, in response to the trigger pulse. In yet other embodiments, the two above-mentioned techniques may be combined, such that the first and second slave devices sample data at approximately the same time and then transmit data consecutively in response to the trigger pulse. Other techniques may also be employed.

Figure 1:
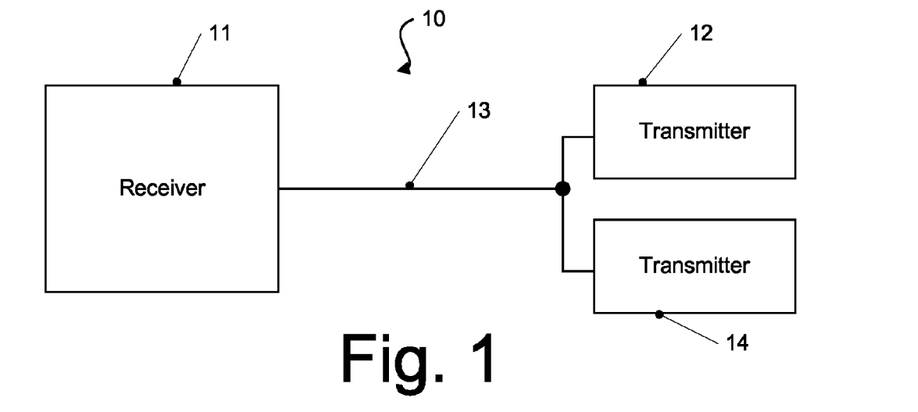
FIG. 1 is a simplified block diagram of a communication system according to some embodiments.

In FIG. 1, a communication system 10 according to an embodiment is shown including a receiver 11 and transmitters 12, 14. Receiver 11 is communicatively coupled to transmitters 12, 14 via one or more communication paths at 13. In one embodiment, receiver 11 is part of one integrated circuit chip and transmitters 12, 14 are part of other integrated circuit chips. In other embodiments, receiver 11 and transmitters 12, 14 may be part of a same integrated circuit chip. In one embodiment, receiver 11 may be a controller, for example an ECU. In some embodiments, transmitters 12, 14 may be sensors or other devices. In some embodiments, receiver 11 and transmitters 12, 14 may communicate via a SPC protocol or other bidirectional edge-based PWM protocol. An edge-based PWM protocol is a protocol where edges of pulse width modulated signals are detected, and information like data to be transmitted is encoded e.g. in pulse lengths of the pulse width modulated signal. In other embodiments, other communication techniques may be used. While two transmitters 12, 14 are illustrated in the example of FIG. 1, in other embodiments more than two transmitters, for example more than two sensors or other devices, may be provided in communication system 10. In some embodiments, receiver 11 sends a trigger pulse via communication path 13. In some embodiments, a predetermined trigger pulse may trigger an action both in transmitter 12 and in transmitter 14. In some embodiments, response to the trigger pulse both transmitters 12 and 14 may respond to receiver 11, for example consecutively transmit data to receiver 11. For example, transmitter 14 may transmit data to receiver 11 upon completion of a data transmission from transmitter 12 to receiver 11.

Additionally or alternatively, transmitters 12, 14 may e.g. be sensors and sample data to be transmitted later upon receipt of the predetermined trigger pulse. In other embodiments, other techniques may be employed.

Figure 2:
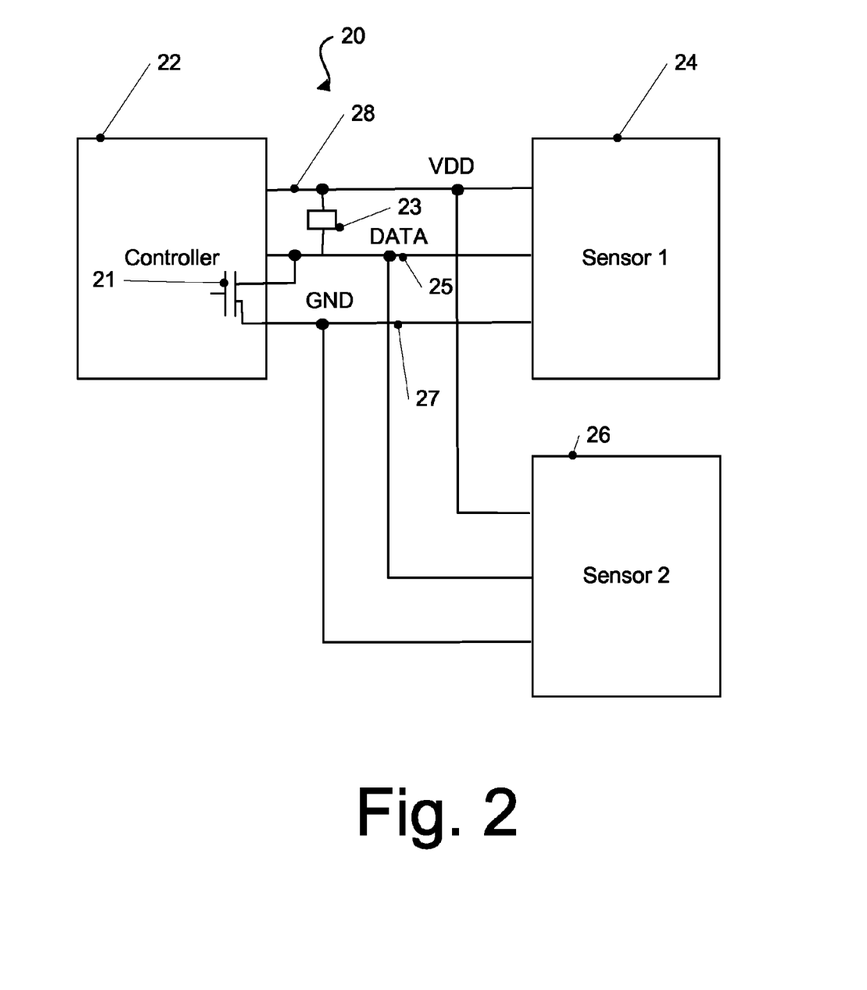
FIG. 2 is a block diagram of a communication system according to an embodiment.

In other embodiments, as illustrated in FIG. 2, a receiver or other controller 22 (e.g. master) may communicate with a plurality of transmitters, for example sensors 24 and 26 in a system 20. Controller 22 in the embodiment shown is electrically coupled to each of sensors 24 and 26 via a three-wire connection. In other embodiments, two-wire connections or any other connections may be used. Controller 22 may communicate with sensors 24 and 26 e.g. via an SPC protocol or other bidirectional edge-based PWM protocol. In the embodiment shown in FIG. 2, electrically coupling the three-wire connection controller 22 to first sensor 24 and second sensor 26 comprises a VDD power supply line 28, a data line 25 and a reference line such as ground line 27. In an embodiment, system 20 may be part of an automobile's electrical system. In other embodiments, other numbers of sensors or other components may be used. In an embodiment, controller 22 communicates with first sensor 24 and second sensor 26 via open drain/open collector interfaces including one or more pull-up resistors. For example, system 20 includes a pull-up resistor 23 that has a first end electrically coupled to power supply line 28 and a second end electrically coupled to data line 25, and controller 22 includes an open drain transistor 21 that has one end of its drain-source path electrically coupled to data line 25 and the other end electrically coupled to ground line 27. Sensors 24 and 26 may comprise similar open drain transistors or current sinks (not shown). In other embodiments, push-pull drivers may be used in controller 22 and/or sensors 24, 26. Controller 22 and each of the first and second sensors 24 and 26 share a single communication path that is communicating via voltage signals on data line 25, e.g. PWM signals. Controller 22 and each of the first and second sensors 24, 26 may comprise further circuitry components for transmitting and receiving data, for example logic circuits and/or drive circuits for controlling transistor 21 or other drivers to transmit corresponding pulses on data line 25. Such components may be implemented in hardware, software, firmware or combinations thereof.

When communicating for example according to an SPC protocol, controller 22 may transmit a request signal that is received by the first and second sensors 24 and 26 via data line 25. The request signal may include a trigger signal (pulse) and/or a sensor identification signal, which selects one of the first and second sensors 24 and 26. In addition, a remainder of the request signal may include any other commands and/or data to be transmitted to the selected sensor. For example, the trigger signal may be a pulse where controller 22 via transistor 21 pulls data line 25 to ground, a duration of the pulse indicating an ID of the sensor. In other embodiments current pulses or other electrical quantities may be used to achieve the same functionality.

The first and second sensors 24 and 26 receive the request signal including the trigger signal and the sensor identification signal. In conventional approaches, one of the first and second sensors 24 and 26 is selected via the sensor identification signal, for example encoded in a pulse width, pulse height or other, and the selected sensor transmits a reply signal via data line 25.

In some embodiments, at least one predetermined sensor identification signal triggers an action in at least two sensors, for example both in first sensor 24 and second sensor 26. For example, in some embodiments, a predetermined identification signal may cause first sensor 24 and second sensor 26 to consecutively transmit data (for example, a first data transmission by first sensor 24 followed by a second data transmission by second sensor 26) without separate sensor identification signals for the two sensors. In other embodiments, additionally or alternatively, a predetermined sensor identification signal may cause both first sensor 24 and second sensor 26 to sample data at least approximately at the same time upon receipt of the sensor identification signal.

Concept and techniques discussed above, for example with reference to FIGS. 1 and 2, will now further be illustrated using example signals with reference to FIGS. 3 to 10. The signals shown in FIGS. 3 to 10 serve merely for further illustration and are not to be construed as limiting. For example, in other implementations, signal way forms may differ from the ones shown and illustrated in FIGS. 3 to 10. For example, while in FIGS. 3 to 10 separate synchronization pulses are shown, in other implementations synchronization pulses may overlap with trigger pulses and/or data pulses. For illustrative purposes, the signals of FIGS. 3 to 10 may be explained using the communication systems of FIGS. 1 and 2 as examples. However, corresponding signals may also be present in other communication systems according to other embodiments. Furthermore, while sensor devices will be used as examples for slave devices in the following explanations, in other embodiments other slave devices may be used.

Figure 3:
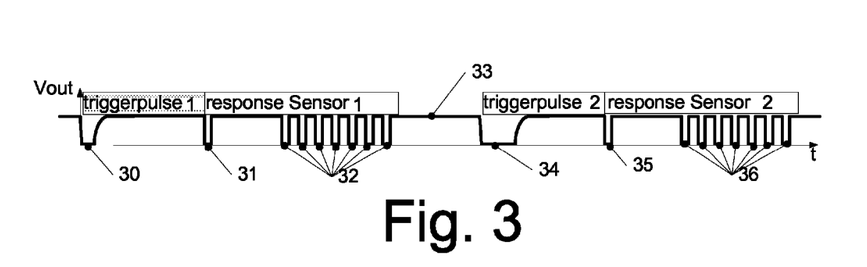
FIGS. 3 to 10 are diagrams illustrating signals and techniques of various embodiments.

FIG. 3 shows signals in a conventional SPC system to provide a comparative example for the signals according to some embodiments illustrated with reference to FIGS. 4 to 6 later. In the example of FIG. 3, a master device like controller 22 of FIG. 2 sends a first trigger pulse 30 on a bus, for example on data line 25 of FIG. 2. In the example of FIG. 2, for generating trigger pulse 30, transistor 21 may couple data line 25 to ground line 27 for a predetermined duration. After that, a voltage on data line 25 may be pulled up to VDD by pull-up resistor 23. In other embodiments, other techniques may be used. In the example of FIG. 3, a duration of first trigger pulse 30 is assigned to a first sensor. The first sensor replies with a synchronization pulse 31 by pulling for example a signal on a data line low for a short time and then pushing it high again (by an active driver or a pull-up resistor) again. Synchronization pulse 31 may for example be started after a predetermined time after the falling edge of trigger pulse 30. The predetermined time may be chosen to accommodate for example all possible lengths of trigger pulses in a given system. Synchronization pulse 31 is followed by data pulses 32, also referred to as data nibbles. A width of the data pulses may correspond to a respective bit value. In some embodiments, operating according to an SPC protocol, a predetermined number of data pulses, for example seven data pulses may be used, although the value may vary in other implementations.

After the data pulses 32, as indicated by a waiting time 33, the data line may be on a high state. For example, a length of the high state at 33 plus a length of the data pulses at 32 may correspond to a maximum length of data pulses (which may vary depending on the data sent) plus some safety margin.

After this, in the example of FIG. 3, a second trigger pulse 34 is sent by a master. Second trigger pulse 34 in the example shown has a duration different from a duration of first trigger pulse 30. Second trigger pulse 34 may be associated with a second sensor like sensor 26 of FIG. 2. In response to second trigger pulse 34, the second sensor responds with a synchronization pulse 35 followed by data pulses 36. After this, further trigger pulses, either for further sensors or again for the first or second sensor, may be sent, followed by corresponding responses by the respective sensor.

Figure 4:
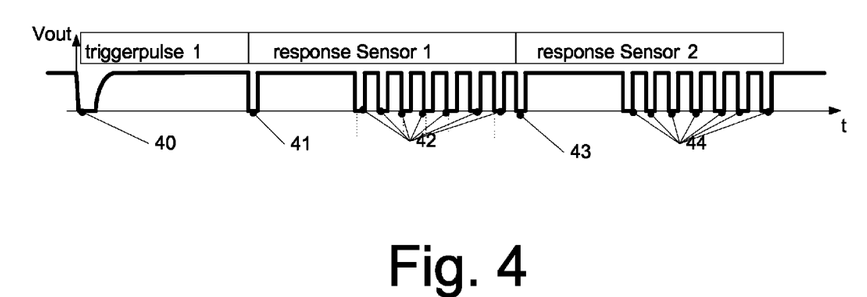

In FIG. 4, example signals according to an embodiment are illustrated.

In FIG. 4, a master device, for example controller 22 of FIG. 2, sends a trigger pulse 40, for example by coupling a data line like line 25 to a ground line like line 27, for example by using transistor 21. In the example case of FIG. 4, trigger pulse 40 has a length which causes two slaves, for example two sensors, to respond. First, in the example of FIG. 4 a first sensor responds by a synchronization pulse 41 followed by a number of data pulses 42, for example seven data pulses 42 in the example of FIG. 4. A second sensor may count the data pulses. After the seventh data pulse, the second sensor transmits a synchronization pulse 43 followed by seven data pulses 44.

The order in which the first and second sensors respond may be predetermined. For example, a sensor with a lowest address value may respond first, followed by a sensor with a second lowest address value. In some embodiments with more than two sensors, this may be followed by a response from a sensor with the third lowest address value etc. In other embodiments, other orders may be used.

In other embodiments, other numbers of data pulses 42 may be used. For example, generally, the number of data pulses may be predetermined, and the second sensor may start transmitting after the last sensor data pulse of the first sensor.

In some embodiments, each of the first sensor and/or second sensor in addition may have a dedicated trigger pulse length associated thereto for triggering a response only from the first sensor and/or for triggering a response only from the second sensor. In other embodiments, only trigger pulse 40 may be provided to trigger a response from first sensor and second sensor.

By counting the number of pulses 42 and responding only after the last pulse, collision avoidance is ensured, i.e., a simultaneous transmission of the first and second sensors may be prevented. In some embodiments, for counting the data pulses for example falling edges, rising edges or both may be counted.

In some cases, for example due to failures, the first sensor may not respond. In other cases, only some data pulses may be transmitted, for example also due to failure of the first sensor. In other embodiments, depending on the protocol used, the number of data pulses may be varied, but a maximum time for data transmission may be fixed. In such cases, FIG. 5 illustrates a technique according to an embodiment how the second sensor may transmit nevertheless.

Figure 5:
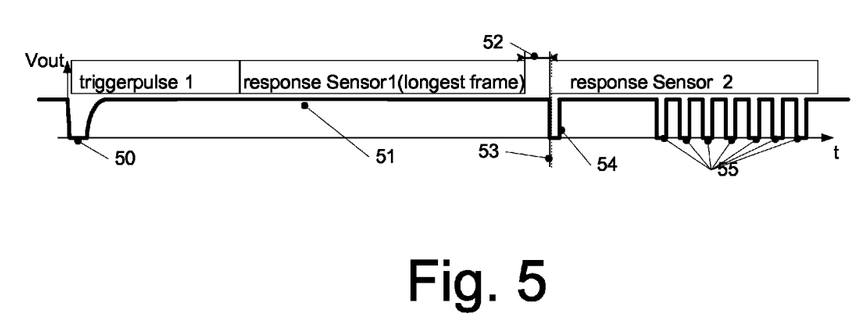

In the example embodiment of FIG. 5, a master sends a trigger pulse 50, which may correspond to trigger pulse 40 of FIG. 4. However, in this case as indicated by 51, the first sensor does not respond, for example due to a failure of the first sensor or a failure of a connection to the first sensor. In this case, after a longest time of a frame (for example seven data pulses plus synchronization pulse with longest possible data pulses) plus a safety margin time 52, at a point in time 53), the second sensor as illustrated in FIG. 5 starts transmission. Transmission of the second sensor in the example of FIG. 5 comprises a synchronization pulse 54 and seven data pulses 55 to give an example. The safety margin time 52 may for example account for clock tolerances or other tolerances.

Similar techniques may apply when the first sensor only sends a synchronization pulse, possibly followed by some data pulses, but not the complete number of data pulses. Also in this case, in some embodiments, the second sensor may start transmitting after a longest frame time, possibly plus a safety margin time, i.e., after a predetermined time.

As can be seen when comparing FIG. 4 and FIG. 3, in FIG. 4 both the waiting time 33 and the time necessary for the second trigger pulse 34 may be saved, which in some embodiments may ultimately lead to higher data rates.

In some embodiments, sensors triggered by common trigger pulse as illustrated in FIG. 4 may be used together with sensors which are triggered by an individual trigger pulse as illustrated in FIG. 3, for example legacy sensors. An example for corresponding signals is shown in FIG. 6.

Figure 6:
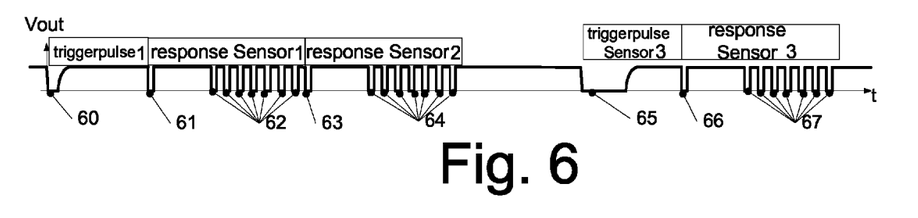

Pulses 60 to 64 in FIG. 6 may correspond to pulses 40 to 44 of FIG. 4 and will therefore not be described again in detail. In particular, in FIG. 6 following a trigger pulse 60, a first sensors responds with a synchronization pulse 61 followed by seven data pulses 62. After the seventh data pulse, a second sensor responds with a synchronization pulse 63 followed by seven data pulses 64.

Following data pulses 64 and a waiting time, in the example of FIG. 6 the master transmits a second trigger pulse 65. Second trigger pulse 65 in the example of FIG. 6 has a pulse length different from first trigger pulse 60 and the example of FIG. 6 identifies a third sensor. The third sensor may be a legacy sensor not adapted to the techniques of two or more sensors responding to a single trigger pulse as explained previously. Responsive to the second trigger pulse 65, the third sensor responds with a synchronization pulse 66 followed by data pulses 67, as illustrated in FIG. 6.

It should be noted that in some implementations, also the first sensor of FIG. 4, 5 or 6 may be a legacy sensor which simply responds to its trigger pulse 40, 50 or 60. The second sensor is then a sensor according to an embodiment adapted to respond to the first trigger pulse after the first sensor.

In some embodiments, sensors like first sensor 24 and second sensor 26 may sample sensor data directly prior to transmitting data. For example, in some implementations, similar to conventional SPC systems, the sampling may occur essentially at the start of sending the synchronization pulse. Sampling in this respect refers to an act of the sensor which "fixes" the data to be sent. For example the data sensed by the sensor at the time of sampling may be sent later. It should be noted that sampling essentially at the start of sending the synchronization pulse as described herein and shown in some of the Figures is merely an illustrative example, and other points in time may also be used for sampling. For example, in other embodiments the sampling may occur for example at a falling edge of a corresponding trigger pulse, which in some embodiments enables a controller (e.g. a controller like an ECU that sends the trigger pulse) to "know" the sampling time more precisely, e.g. with a reduced influence e.g. from deviations of a sensor clock. In some embodiments, when triggering of the sensor to send data fails, e.g. when it turns out that the sensor was not to be addressed, the sampled data may be discarded.

Figure 7:
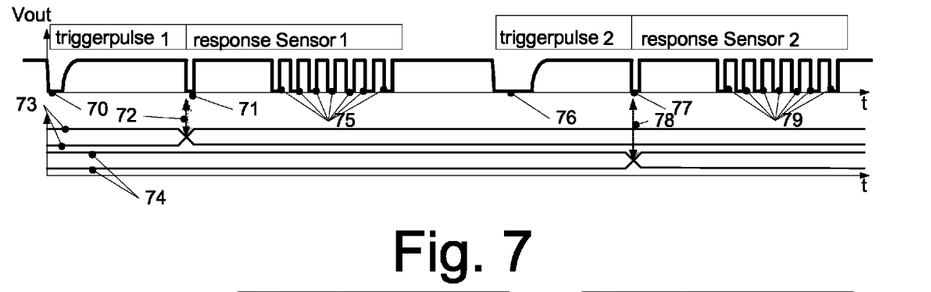
Figure 8:
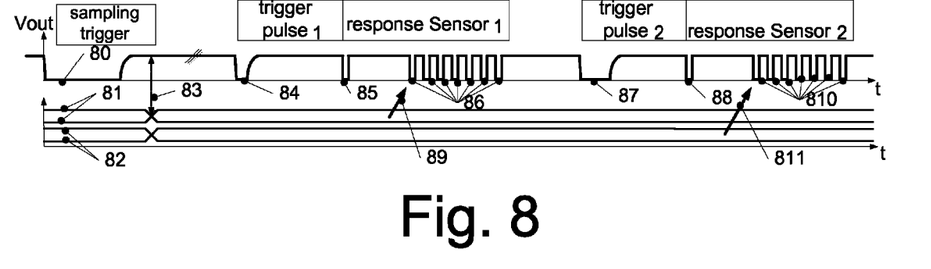
Figure 9:
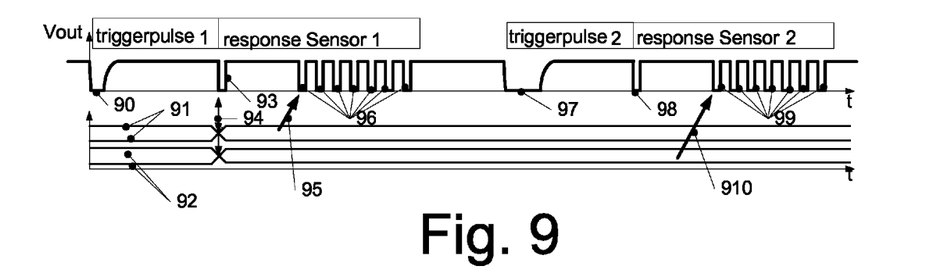
Figure 10:
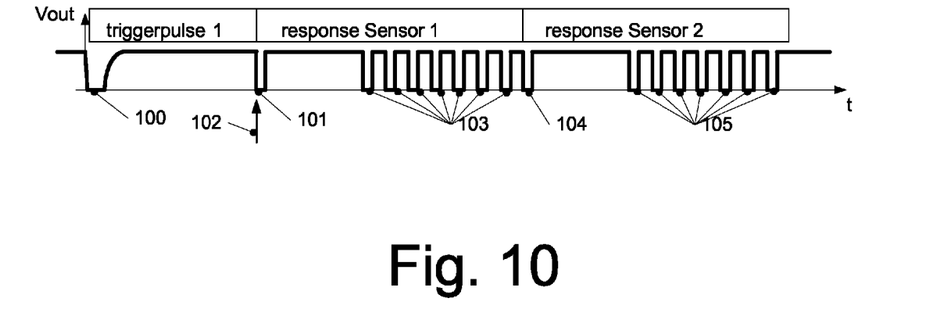

For a conventional SPC system and as comparative example for the explanations with reference to FIGS. 8 to 10 which follow, FIG. 7 illustrates data sampling for such a conventional system.

In the example of FIG. 7, a master device, for example controller 22, transmits a first trigger pulse 70. A first sensor responds by a synchronization pulse 71 followed by data pulses 75. Trigger pulse 70, synchronization pulse 71 and data pulses 75 may correspond to trigger pulse 30, synchronization pulse 31 and data pulses 32 of FIG. 3.

After a waiting time, the master device transmits a second trigger pulse 76 with a different pulse length than the first trigger pulse 70. A second sensor, for example sensor 26, responds with a synchronization pulse 77 followed by data pulses 79. Trigger pulse 76, synchronization pulse 77 and data pulses 79 may correspond to trigger pulse 34, synchronization pulse 35 and data pulses 36 of FIG. 3.

73 illustrates data sampled within the first sensor. Such a data value may for example be stored in an internal storage element or register of the first sensor, but is not limited thereto. 74 illustrates a corresponding data value for the second sensor. The illustration of data 73 and 74 in FIG. 7 in form of two lines for data 73 and two lines for data 74 (resembling a differential signal) as well as corresponding illustrations in FIGS. 8 and 9 serve merely illustration purposes, and data may be provided and/or stored in the first and second sensors in any convenient form, e.g. using any kind of convenient signals.

As indicated by an arrow 72, in first sensor the data is sampled (corresponding to an updating of the data signal value, for example) after the end of the first trigger pulse 70, for example coinciding with the start of synchronization pulse 71. The data value obtained at 72 may for example then be sent in data pulses 75. Likewise, the second sensor as indicated by an arrow 78 samples data after second trigger pulse 76, for example essentially at the start of synchronization pulse 77. The data value sampled at 78 may then be transmitted in data pulses 79. Therefore, in such a conventional scheme, the first sensor and the second sensor sample data at different points in time. However, for some applications, it may be desirable to sample data essentially at the same point in time, for example to be able to perform consistency checks. In the following, techniques according to various embodiments will be illustrated using example signals of FIGS. 8 to 10 which may enable an essentially simultaneous data sampling in two or more sensors.

For example, in some embodiments, a dedicated trigger pulse may be used to cause sensors, for example a first sensor and a second sensor, to sample data. Then, further trigger pulses may be used to cause the sensors to transmit data. FIG. 8 illustrates example signals for such an embodiment.

In FIG. 8, 81 illustrates sampled data of a first sensor, and 82 illustrates sampled data of a second sensor. In the example of FIG. 8, a master device, for example controller 22 of FIG. 2, sends a trigger pulse 80, also referred to as sampling trigger pulse. The sampling trigger pulse may have a specific pulse length enabling sensors to recognize the pulse 80 as a sampling trigger pulse. For example, in some embodiments, sampling trigger pulse 80 may have a length different from trigger pulses triggering data transmission from sensors.

In response to the sampling trigger pulse 80, as indicated by an arrow 83, both first and second sensor sample data essentially at the same time. Essentially at the same time in some embodiments may mean that deviations for example due to different signal run times (for example due to different lengths of data line 25 to sensor 24 and to sensor 26) and/or due to different sensor implementations and/or due to different clocking may still occur.

The sampling may for example occur a predetermined time after the start (falling edge) of trigger pulse 80, for example at a time where for a regular trigger pulse which initiates a data transmission a synchronization pulse would be initiated. Other techniques may also be employed.

Following the sampling trigger pulse 80, in the example of FIG. 8 the master device sends a trigger pulse 84 with a length identifying for example the first sensor. The first sensor responds with a synchronization pulse 85 followed by data pulses 86. As indicated by an arrow 89, the first sensor may transmit the data sampled at 83 with data pulses 86.

Following data pulses 86, in the example of FIG. 8, the master device sends a trigger pulse 87 identifying the second sensor. The second sensor in the example of FIG. 8 then responds with a synchronization pulse 88 followed by data pulses 810. In data pulses 810, as indicated by an arrow 811, the data captured by the second sensor at 83 may be transmitted.

Therefore, in the embodiment of FIG. 8 for the first and second sensors three pulses of different lengths are used, the sampling trigger pulse 80, the trigger pulse 84 identifying the first sensor and the trigger pulse 87 identifying the second sensor. While in the example of FIG. 8 trigger pulse 84 is the shortest and trigger pulse 80 the longest, in other embodiments different length relations may be used. Moreover, in some embodiments more than two sensors may be used. In such embodiments, trigger pulse 80 may trigger a sampling in more than two sensors, and then different trigger pulses may be used for triggering data transmission from the more than three sensors.

In other embodiments, a sampling trigger pulse may simultaneously be used to initiate data transfer from one of the sensors. Signals according to a corresponding embodiment are illustrated in FIG. 9.

In FIG. 9, 91 represents a data sampled in a first sensor, and 92 represents a data sampled in a second sensor.

In the example of FIG. 9, a master (for example controller 22 of FIG. 2) sends a trigger pulse 90. Trigger pulse 90 triggers a sampling of data both in the first sensor (for example sensor 24 of FIG. 2) and in the second sensor (for example sensor 26 of FIG. 2), as indicated by an arrow 94. With respect to sampling, trigger pulse 90 may have the same function as sampling trigger pulse 80 of the embodiment of FIG. 8.

Furthermore, in the embodiment of FIG. 9, trigger pulse 90 serves as a trigger pulse for triggering data transmission from the first sensor. Correspondingly, in the embodiment of FIG. 1, the first sensor responds to trigger pulse 90 with a synchronization pulse 93 followed by data pulses 96. With data pulses 96, as indicated by an arrow 95, data sampled by the first sensor at 94 may be transmitted.

After the transmission of data pulses 96, the master in the embodiment of FIG. 9 transmits a second trigger pulse 97 triggering data transmission from the second sensor. In response to trigger pulse 97, the second sensor transmits a synchronization pulse 98 followed by data pulses 99. As indicated by an arrow 910, data pulses 99 may transmit the data sampled by the second sensor at 94.

Therefore, in the embodiment of FIG. 9, trigger pulse 90 serves as a sampling trigger for both the first and second sensor and for triggering data transfer of the first sensor. Second trigger pulse 97 serves for triggering data transfer of the second sensor.

In the embodiment of FIG. 9, in some cases the first sensor may be a legacy sensor which e.g. does not support techniques for simultaneous sampling as discussed herein. For example, in FIG. 9 the first sensor may behave similar to the first sensor in the conventional case illustrated in FIG. 7. The second sensor in the embodiment of FIG. 9 is adapted to employ techniques according to embodiments and to sample data upon receipt of first trigger pulse 90 (i.e. essentially simultaneously with the first sensor), and then later send the data in response to the second trigger pulse 97. In this case, unlike the conventional approach of FIG. 7, second trigger pulse 97 does not cause the second sensor to sample data. Other techniques may also be employed. Moreover, also the scheme of FIG. 9 may be extended to more than two sensors.

Furthermore, in some embodiments a trigger pulse may serve for causing a plurality of sensors to sample data and for triggering data transfer of a plurality of sensors. This may for example amount to a combination of the embodiments of FIGS. 4 and 8. A corresponding embodiment is illustrated in FIG. 10.

In the embodiment of FIG. 10, a master device (for example controller 22 of FIG. 2) sends a trigger pulse 100, for example on data line 25 of FIG. 2. In response thereto, as indicated by an arrow 102, a first sensor and a second sensor both sample data essentially at the same time. Therefore, regarding the sampling of data the response of the first and second sensors to trigger pulse 100 may be the same as the response of the first and second sensors to trigger pulse 80 in the embodiment of FIG. 8.

Moreover, in response to trigger pulse 100, the first sensor transmits a synchronization pulse 101 followed by data pulses 103. For example, the first sensor may transmit data sampled at 102 with data pulses 103. After completion of transmission of the first sensor, the second sensor transmits a synchronization pulse 104 followed by data pulses 105. For example, the second sensor may count the data pulses transmitted by the first sensor and start transmission after the last data pulse (for example seventh data pulse in the example shown) was detected. In data pulses 105, the second sensor may transmit data sampled at 102.

Therefore, the data transmission of the first and second sensors in response to trigger pulse 100 essentially is as explained with reference to FIG. 4, with the addition that both sensors essentially sample their data at the same time (i.e. at 102), similar to the response to sampling trigger 80 of FIG. 8. It should be noted that in the embodiment of FIG. 10 in case the first sensor does not respond (for example due to a failure), techniques as discussed with reference to FIG. 5 may apply. Moreover, also in the embodiment of FIG. 10 the first sensor may be a legacy sensor which simply responds to its trigger pulse 100 by sampling and transmitting data, whereas the second sensor may be a sensor equipped to employ techniques as discussed herein to also respond to trigger pulse 100.

Moreover, also in the embodiments discussed with reference to FIGS. 8 to 10, further sensors may be triggered in a conventional way, similar to the third sensor discussed with reference to FIG. 6.

It is to be emphasized again that the waveforms of signals discussed with reference to FIGS. 3 to 10 serve only as examples and are not to be construed as limiting. For example, depending on the kind of driver used for driving the line in master and slave devices, waveforms may differ. The waveforms shown may for example be waveforms generated by an open drain driver like transistor 21 on master side and push-pull drivers on slave (sensor) side. In other embodiments, other kinds of drivers may lead to different signal wave forms, for example as regards edge steepness.

Next, with reference to FIGS. 11 to 13 methods according to various embodiments will be discussed. The methods discussed with reference to FIGS. 11 to 13 may be implemented in devices and systems and as discussed with reference to FIGS. 1 and 2 and/or may employ signal wave forms as discussed with reference to FIGS. 3 to 10, but are not limited thereto. While the methods are depicted as a series of acts or events, the order in which such acts or events are presented are not to be construed as limiting. In particular, in other embodiments, the order may differ, including the possibility of various actions being performed in parallel. In some embodiments, the methods of FIGS. 11 to 13 may be employed in a bidirectional edge-based pulse width modulation (PWM) system.

Figure 11:
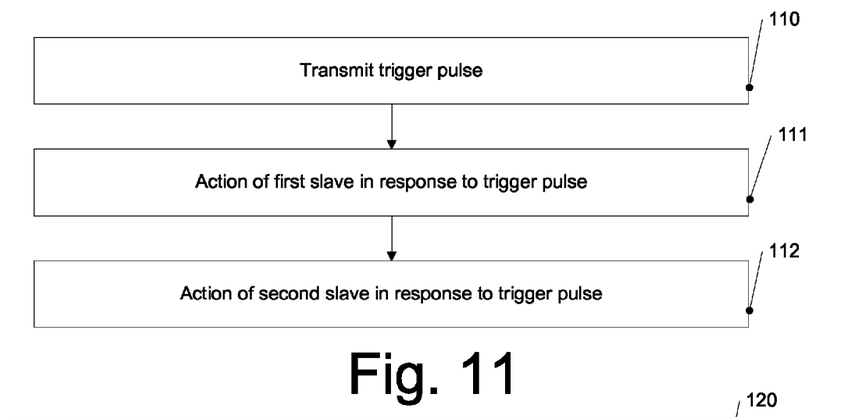
FIGS. 11 to 13 show flow charts illustrating methods according to various embodiments.

Turning now to FIG. 11, at 110 the method of FIG. 11 comprises transmitting a trigger pulse. The trigger pulse may be transmitted by a master device like a controller. Transmitting the trigger pulse may comprise pulling a data line low for a predetermined time.

At 111, a first slave device, for example a first sensor, performs an action in response to the trigger pulse sent at 110. The action may for example comprise a sampling of data or a transmission of data or other information. Moreover, at 112 a second slave performs an action in response to the trigger pulse sent at 110. The action may for example comprise a sampling of data and/or a transmission of data.

Figure 12:
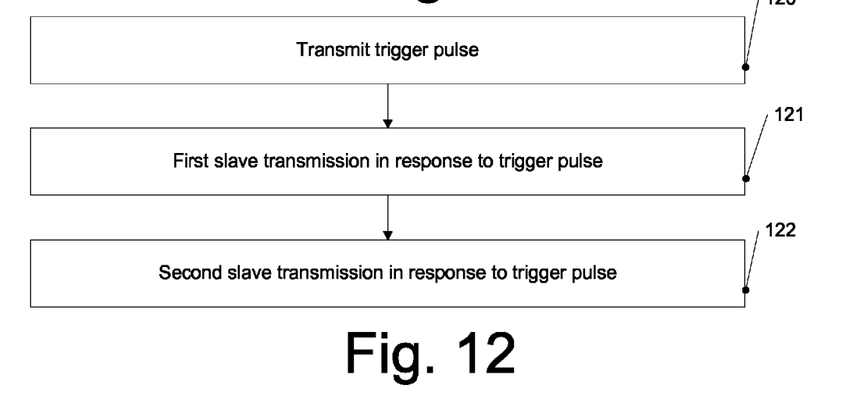

In FIG. 12, a further embodiment is illustrated. The embodiment of FIG. 12 at 120 comprises transmitting a trigger pulse. At 121, the embodiment of FIG. 12 comprises a first slave transmission in response to the trigger pulse. At 122, the method of FIG. 12 comprises a second slave transmission in response to the trigger pulse. The second slave transmission may for example follow the first slave transmission. For example, in some embodiments, the second slave may monitor the first slave transmission and start its own transmission upon completion of the first slave transmission. In some embodiments, the method of FIG. 12 may produce signals for example as discussed with reference to FIG. 4.

Figure 13:
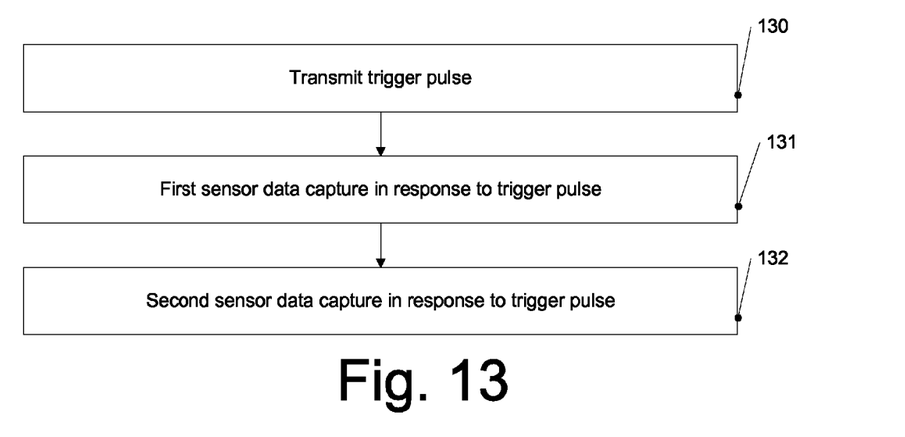

In FIG. 13, a further embodiment of a method is illustrated. The method in FIG. 13 comprises, at 130, transmitting a trigger pulse from a master device. At 131, the method comprises a data capture (e.g. sampling) of a first sensor in response to the trigger pulse. Furthermore, at 132, the method comprises a data capture (e.g. sampling) of a second sensor in response to the trigger pulse. The data capture of the second sensor, for example data sampling at 132 may be essentially simultaneously to the data capture of the first sensor at 131. In some embodiments, signals generated by the method of FIG. 13 may essentially correspond to signals as discussed with reference to FIG. 8 or 9. Furthermore, the methods of FIGS. 12 and 13 may also be combined, which may lead to signal resembling the signals discussed with reference to FIG. 10. Other techniques and signals may also be used.

It should be noted that the embodiments discussed above serve merely as examples and are not to be construed as limiting. Instead, the embodiments discussed above are to be merely regarded as example implementations of techniques discussed herein.

What is claimed is:

1. A bidirectional edge-based pulse width modulation communication system, comprising:
   a master device,
   a plurality of slave devices, and
   a communication path coupling the master device with the plurality of slave devices,
   wherein the master device is adapted to transmit a predetermined first trigger pulse, wherein the predetermined first trigger pulse comprises one of a plurality of different trigger pulses used by the bidirectional edge-based pulse width modulation communication system to the plurality of slave devices,
   wherein at least two slave devices of the plurality of slave devices are adapted to perform an action in response to the predetermined first trigger pulse,
   wherein the action comprises simultaneous data sampling in the at least two slave devices, and
   wherein in response to the predetermined first trigger pulse only a first one of the at least two slave devices performs a transmission of data, and in response to a second predetermined trigger pulse different from predetermined the first trigger pulse a second one of the at least two slave devices performs a transmission of data.

2. The system of claim 1, wherein a second slave device of the at least two slave devices is adapted to transmit data in response to the predetermined first trigger pulse after completion of a data transmission of a first slave device of the at least two slave devices of the plurality of slave devices.

3. The system of claim 1, wherein the at least two slave devices comprise sensors, wherein the data sampling corresponds to a fixing of data by the sensors for later transmission.

4. The system of claim 1, wherein the plurality of different trigger pulses comprises a plurality of different trigger pulses having different pulse lengths.

5. The system of claim 4, wherein the plurality of different trigger pulses correspond to a signal on a data line being pulled low for different amounts of time.

6. The system of claim 1, wherein the plurality of different trigger pulses comprise slave identifications.

7. The system of claim 1, further comprising a common bus coupling the master device and the at least two slave devices, wherein the master device is configured to transmit the first and second trigger pulses over the common bus.

8. A slave device comprising:
   a driver adapted to communicate based on bidirectional edge-based pulse width modulation protocol; and
   the slave device being adapted to receive a predetermined trigger pulse, wherein the predetermined trigger pulse comprises one of plurality of different trigger pulses used by the bidirectional edge-based pulse width modulation protocol and to transmit data in response to the predetermined trigger pulse, wherein in a case where a complete data transmission of a further slave device occurs in response to the predetermined trigger pulse, the slave device is adapted to start its transmission in response to the predetermined trigger pulse after the data transmission of the further slave device, and
   wherein the slave device is adapted to start its transmission in response to the predetermined trigger pulse a predetermined time after the predetermined trigger pulse in a case where no complete data transmission of the further slave device occurs.

9. The slave device of claim 8, wherein the slave device is adapted to count a number of data pulses transmitted by the further slave device and to determine that the transmission of the further slave device is complete when the number of data pulses reaches a predetermined number.

10. The slave device of claim 8, wherein the transmission of data comprises a synchronization pulse followed by a predetermined number of data pulses.

11. A method, comprising:
   transmitting a trigger pulse by a master device in a bidirectional edge-based pulse width modulation communication system,
   performing an action in a first slave device in response to a predetermined trigger pulse, wherein the predetermined trigger pulse comprises one of a plurality of different trigger pulses used by the bidirectional edge-based pulse width modulation communication system,
   performing an action in a second slave device in response to the predetermined trigger pulse,
   wherein performing the action in the first slave device comprises transmitting data by the first slave device in response to the predetermined trigger pulse, and wherein performing the action in the second slave device comprises transmitting data in the second slave device after completion of data transmission by the first slave device,
   wherein, in case of a failure of the first slave device to completely transmit data, the method comprises transmitting data from the second slave device a predetermined time after the predetermined trigger pulse by:
      counting, by the second slave device, a number of data pulses sent by the first slave device; and
      starting data transmission by the second slave device when a predetermined number of data pulses has been reached.

12. The method of claim 11, wherein performing the action in the first slave device and the action in the second slave device comprises essentially simultaneous sampling of data in the first and second slave devices.

13. The method of claim 11, wherein the predetermined time is equal to or greater than a maximum data transmission time of the first slave device.

14. A slave device comprising:
   a driver adapted to communicate based on bidirectional edge-based pulse width modulation protocol; and
   the slave device being adapted to receive a predetermined trigger pulse, wherein the predetermined trigger pulse comprises one of plurality of different trigger pulses used by the bidirectional edge-based pulse width modulation protocol and to transmit data in response to the predetermined trigger pulse,
   the slave device being adapted to receive a predetermined trigger pulse, wherein the predetermined trigger pulse comprises one of plurality of different trigger pulses used by the bidirectional edge-based pulse width modulation protocol and to transmit data in response to the predetermined trigger pulse after a data transmission of a further slave device is complete,
      wherein, in case of a failure of the further slave device to completely transmit data, the slave device is adapted to transmit data from the further slave device a predetermined time after the predetermined trigger pulse by:
         counting, by the slave device, a number of data pulses sent by the further slave device; and starting data transmission by the slave device when a predetermined number of data pulses has been reached.

15. The device of claim 14, wherein the predetermined time is equal to or greater than a maximum data transmission time of the further slave device.

* * * * *